(12) United States Patent
Ammar (10) Patent No.: US 6,424,728 B1
(45) Date of Patent: Jul. 23, 2002

(54) METHOD AND APPARATUS FOR VERIFICATION OF SIGNATURES

(76) Inventor: Maan Ammar, P.O. Box 10650, Damascus (SY)

( * ) Notice: Subject to any disclaimer, the term of this patent is extended or adjusted under 35 U.S.C. 154(b) by 0 days.

(21) Appl. No.: 09/453,730

(22) Filed: Dec. 2, 1999

(51) Int. Cl.$^7$ ................................................ G06K 9/00
(52) U.S. Cl. .................................................... 382/119
(58) Field of Search ........................ 382/116, 119–123, 382/173, 197, 198, 206, 195, 216, 218; 340/5.52, 5.53, 5.81–5.83; 356/71; 902/3–6; 434/155; 348/161

(56) References Cited

U.S. PATENT DOCUMENTS

| | | | |
|---|---|---|---|
| 4,028,674 A | 6/1977 | Chuang | 340/146.3 SY |
| 5,042,073 A | * 8/1991 | Collet et al. | 382/3 |
| 5,251,265 A | 10/1993 | Dohle et al. | 382/3 |
| 5,559,895 A | 9/1996 | Lee et al. | 382/119 |

OTHER PUBLICATIONS

*Computer Recognition and Human Production of Handwriting*; Maan Ammar, Yuuji Yoshida and Teruo Fukumur. World Scientific Publ. Co., 1989, pp. 61–76.
*Mainichi*; Nagoya University Foreign Student Association Jun. 1989.

Presentation titled: *Portable Software for Signature Verification and Analysis (SIGVA 1.0), Usable With IBM–PC Compatible Machines* by Maan Ammar, Mohammed Aita, Basil Younaki and Bassam Takwa at Basic and Applied Issues in Handwriting and Drawing Research Conference. University of Western Ontario London, Ontario, Canada Aug. 6–10, 1995.

International Journal of pattern Recognition and Artificial Intelligence "Progress in Verification of Skillfully Simulated Handwritten Signatures" Maan Ammar. World Scientific Publ. Co., 1991, vol. 5, No. 1 & 2, pp. 337–351.

* cited by examiner

*Primary Examiner*—Leo Boudreau
*Assistant Examiner*—Brian P. Werner
(74) *Attorney, Agent, or Firm*—Handal & Morofsky (57) ABSTRACT

An automatic signature verification system is set forth that utilizes a main routine for comparing signatures using forensic hand writing methodology. A secondary program is used to modify the algorithms used by the main program for making adjustments thereto based on either additional data consisting of a plurality of genuine or authenticated signatures or changes in a persons signature due to aging or some other physical change resulting in a change in signature features. Over seventy thousand signatures can be verified in one hour using a single personal computer. In addition, authentic signature data having a resolution as low as 80 dpi can be used.

24 Claims, 6 Drawing Sheets

Figure 1

*Shumgrpresstin* — 32, 26

*Shumgrpresstin* — 40

METHOD AND APPARATUS FOR VERIFICATION OF SIGNATURES

BACKGROUND OF THE INVENTION

1. Field of the Invention

The present invention relates to a computerized system for automatically authenticating signatures. More particularly, it relates to a system utilizing forensic methods of analysis while fully automating signature verification thereby reducing the time necessary for verification of a signature to a fraction of a second using ordinary personal computers.

2. Background Information

American businesses and households write over 60 billion checks per year. Banks and their customers lose nearly ten billion dollars (Bank Administration Institute reports) to check fraud due to shortcomings during processing of those checks.

The Office of the Comptroller of the Currency (OCC) has indicated that check fraud is one of the largest challenges facing financial institutions. Modern technology allows more accurate forgeries to occur, making detection more difficult. In addition, technology allows more realistic counterfeit checks and false identification that can be used in combination with forged signatures to defraud banks.

Many difficulties have been encountered in applying automatic signature verification systems to current data environments within banks. There is a need to verify signatures on checks that have a low resolution or poor quality image. The time it takes to verify each check with current automatic computer programs is far too long.

The OCC advises banks to review checks ensuring that the handwriting or print styles are consistent and that there are no signs of erasure or alteration. Banks should also compare the endorsement signatures on items presented and compare the appearance of the presenter with the signature and picture on their identification.

One commercial automatic signature verification system used by banks is provided by SOFTPRO. This system is mainly based upon a neural network training approach. The verification decision is performed using electronic comparison of images in which the set of parameters of the document's signature is compared with all parameter sets of the master signature of the account. Furthermore, every signature is assigned to one of the six defined agreement categories, AA to F, which can be subdivided into five categories if needed. The basis of both training and decision making (accepting the document signature as genuine or rejecting it as a forgery) are drastically different from those of the present invention.

A bank or other financial institution may process millions of checks each day. Even with the help of computerized visual verification systems, only a small portion of the checks will have their signatures examined. This situation makes automatic verification a necessity to deal with large numbers of checks. The processing speed of a system becomes a critical factor for two reasons; (1) the time period allowed for examining all of the checks is only two to four hours; and (2) the number of computers required to perform the work increases in proportion to the time t takes to verify each check.

The SOFTPRO system discussed previously has a speed of 1,800 documents per hour, using a Pentium II processor, which translates into 90,000 documents per hour using fifty computers. This number is far below the requirement of a large bank.

Another critical problem that has heretofore not been solved deals with the current database used by a bank. Some banks currently scan checks using hand scanners which have low resolution capabilities and poor quality signature card images. For example, documents scanned at 120 dpi and 80 dpi are available by the millions. Rescanning all of those documents is too time consuming and expensive. Current systems recommend a minimum of 200 dpi for scanned document data, and may be capable of using data down to 150 dpi with a greatly reduced accuracy. The current systems with resolutions fail to provide meaningful results if data below 150 dpi are used.

A neural network trained using English style signatures can not be used to analyze Chinese style signatures. The network must be trained to handle type of writing, making it difficult to apply generalized software to different languages. Accordingly, there is a need for a system that can overcome the variations in signature.

SUMMARY OF THE INVENTION

In contrast to computerized systems that give the decision via comparison with only one genuine signature sample, the mechanism of giving the decision in the present invention is consistent with forensic examination of handwriting samples. It is a well established fact in forensic examination that a person cannot write their signature the same way twice. Every sample is different from the other to some degree in that the values of the features of each signature vary as to relative size and two dimensional position, relative slants, curvature of letters, and the like. If the differences in the values of selected features of a target signature lie in a selected range of acceptance, as determined by the natural variations of the signature of the specific person, the signature is accepted as genuine, otherwise, it is classified as an attempted forgery. In this context, the present invention uses image processing and pattern recognition techniques to implement forensic examination concepts during the decision making process by comparing the selected features of a target signature with a reference knowledge, or values, of the signature of the specific person obtained from a set of training or genuine signature samples. Training is done on two levels: global, which includes the entirety of a genuine signature database of many persons, and personal, which includes a set of genuine signature samples of a specific person. While the present invention uses a set of genuine training signature samples for every person, it starts making decisions using only one reference signature sample using what is called here accelerated learning. In the beginning of the learning process, it uses the global knowledge as a starting point to give a decision using only one reference signature. When new genuine signatures become available (from new checks or the like) the reference knowledge of a person's signature is updated until it becomes fully dependent on the genuine signatures of that person after only six genuine samples.

A system for automatically verifying signatures includes a program running on a personal computer using at least one authentic signature that has been scanned into a genuine signature data base. A program caused the personal computer to run various algorithms to clean a digitized image of a target signature. The program then normalizes the image and makes Euclidian weighted measurements of forensic features of the target signature, such features being compared with those of the authentic signature features.

The algorithms used can use authentic signatures having a resolution at least as low as eighty dpi.

BRIEF DESCRIPTION OF THE DRAWINGS

In the drawings, like reference characters designate like parts throughout the several views, and.

DESCRIPTION OF THE PREFERRED EMBODIMENTS

Figure 1:
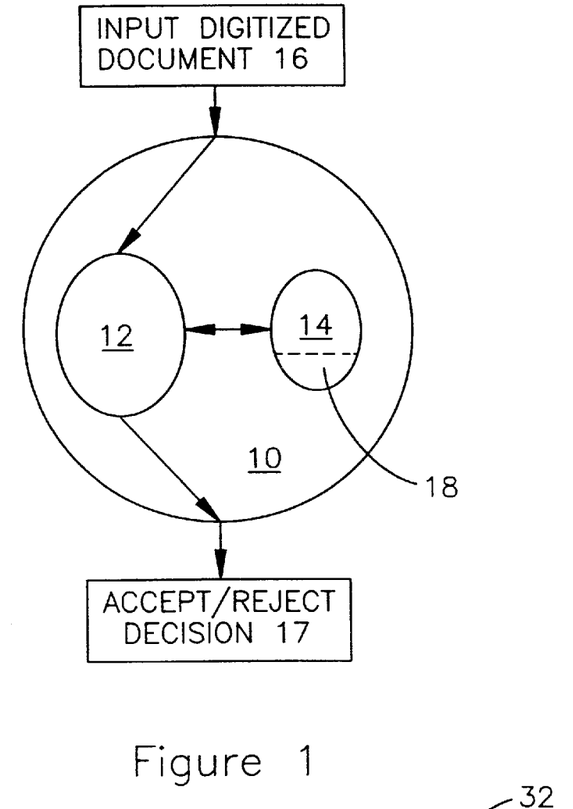
FIG. 1 is a functional block diagram illustrating the relation between two subsystems of the invention, a signature verification program and an automatic evaluation program.

Referring now to FIG. 1, an automatic signature verification system 10 is shown. System 10 includes two main components, a signature comparison program 12 and an automatic evaluating program 14. A target signature 16 or input signature image data from a check in the form of digital data is presented for evaluation to comparison program 12. Program 12 looks to automatic evaluation program 14, which includes an authenticated signature database 18, to provide the required information for comparing the two data sets using forensic comparison methodology. If target signature data 16 is accepted as a genuine signature it is feed back into evaluation program 14 for possible inclusion in authenticated signature database 18, as described in more detail below.

Figure 2:
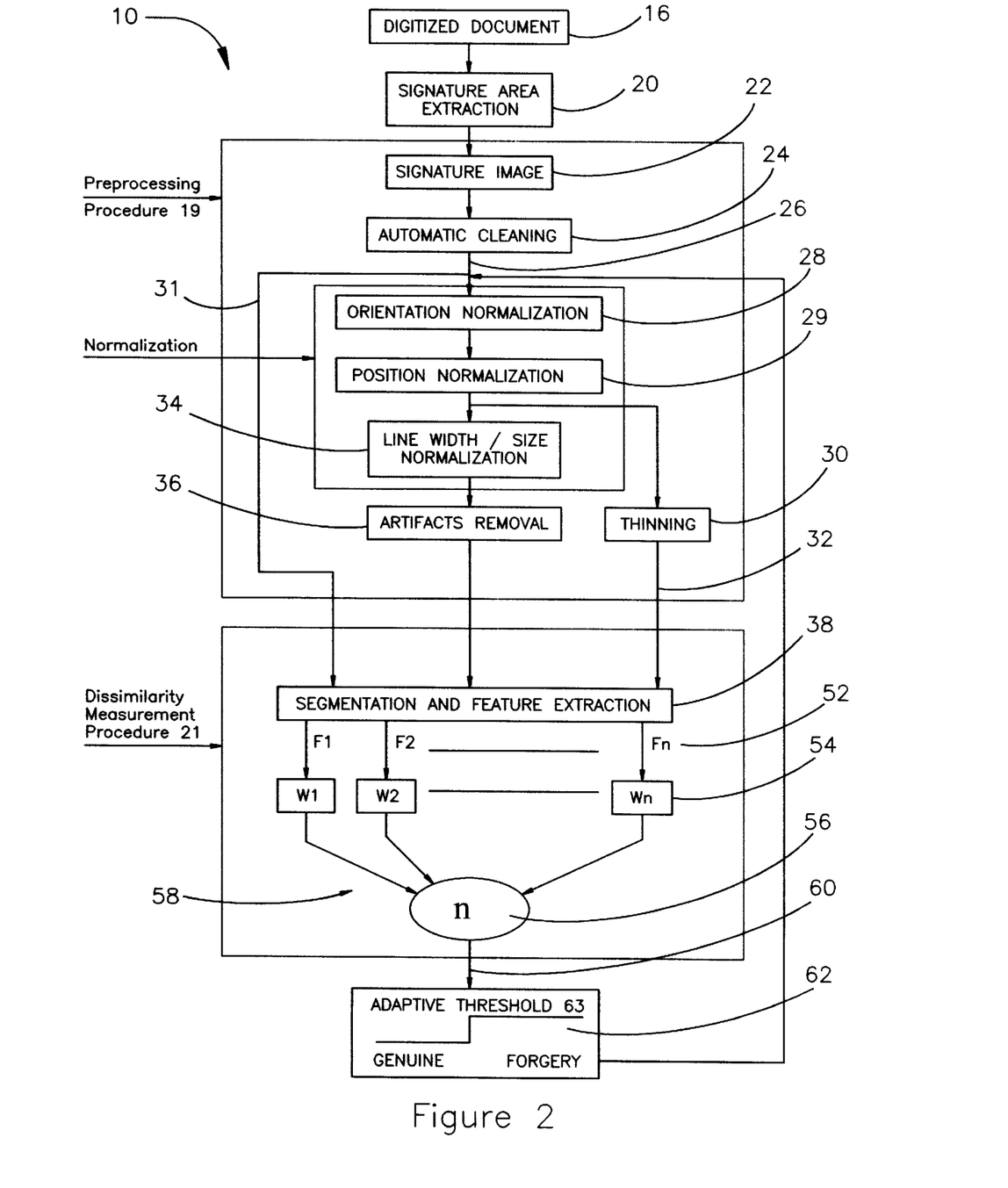
FIG. 2 is a functional block diagram of the automatic signature verification program showing its operational flow chart.

Referring now to FIG. 2, automatic signature verification, or comparison, program 10 will be discussed following a flow chart methodology. Target signature, or input data 16, in the form of digitized data usually generated by a scanner or the like, representing information of an image of a signature from a bank card, check, or the like, is supplied to program 10. From image data 16, a signature area 20 is extracted according to the coordinates of the signature area specified in the particular document type. If original image data 16 is in gray level form, the image from signature area 20 is manipulated to obtain a binary image 22. Binary image 22 is then automatically cleaned 24 using connected component labeling based cleaning with horizontal and vertical line elimination taking place. After automatic cleaning 24 the resulting data represents a clean binary signature image 26 with any background characters, lines and noise eliminated. Cleaned binary signature image 26 is then prepared for feature extraction using forensic handwriting analysis techniques. Image 26 is then checked for orientation. If required, image 26 is normalized to a horizontal position in an orientation normalization routine 28. The orientation normalization routine 28 is only used if target signature 16 is found to be a forgery, since this finding could result from a change in the general orientation of a genuine signature from a normal position. Next, a position normalization routine 29 is utilized to position binary signature image 22. Position normalization routine 29 utilizes a methodology wherein binary image 22 is set to an origin of coordinates at a center of gravity of image 22 such that the later comparison is independent of the relative position of cleaned binary image 26 within signature area 20.

At this point in processing, cleaned binary image 26 continues on parallel paths. Line thinning routine 30 results in a thinned signature image 32. Thinned signature image 32 represents an image where the signature lines are reduced to approximately one pixel in width (see FIG. 3, top image). Along a parallel path, cleaned binary image 26, which may also be position normalized, is then normalized with respect to writing line width and writing line size in writing width and size normalization routine 34. At this point in the processing of the signature image some debris or artifacts may appear due to the prior processing routines. This debris or artifacts are now removed in a filtering routine 36 in preparation for sending the signature image to the next step in its processing.

Figure 3:
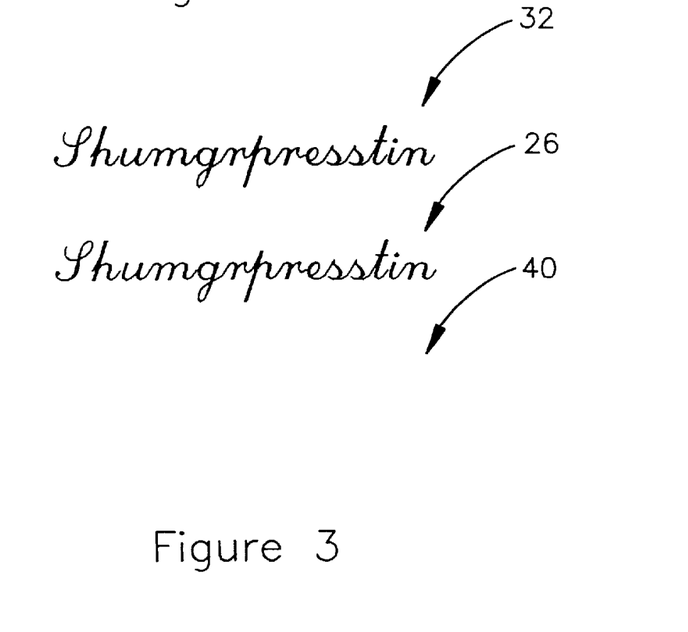
FIG. 3 shows a thinned, binary and boundary detected image of a target signature image.

Three images are now ready to be processed by a segmentation and feature extraction routine 38. Cleaned binary image 26, size and line width normalized image 40 (resulting from writing width and size normalization routine 34) and thinned signature image 32 are sent to dissimilarity measure block 42. Referring now to FIG. 3, thinned signature image 32, binary and boundary detected image 44 and size and line width normalized signature image 40 are used for feature extraction by segmentation and feature extraction routine 38.

Figure 4:
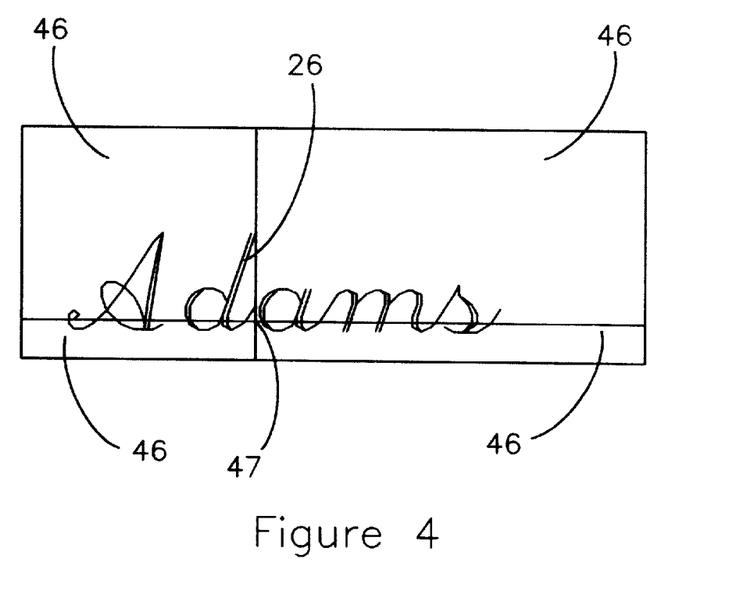
FIG. 4 is a view showing a target signature image segmented in four quadrants using a gravity center method.
Figure 5:
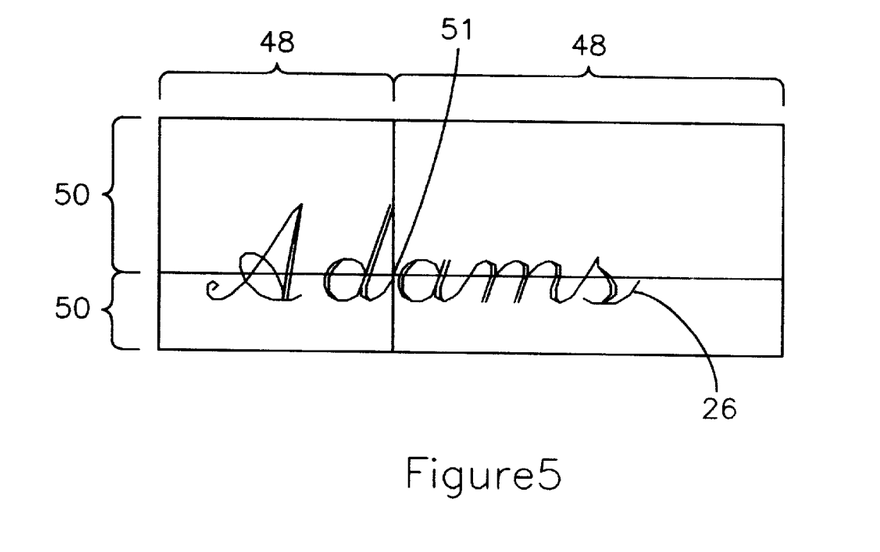
FIG. 5 is a view similar to FIG. 4 showing a target signature image segmented into two horizontal zones and two vertical zones using a geometrical midpoint method.
Figure 6:
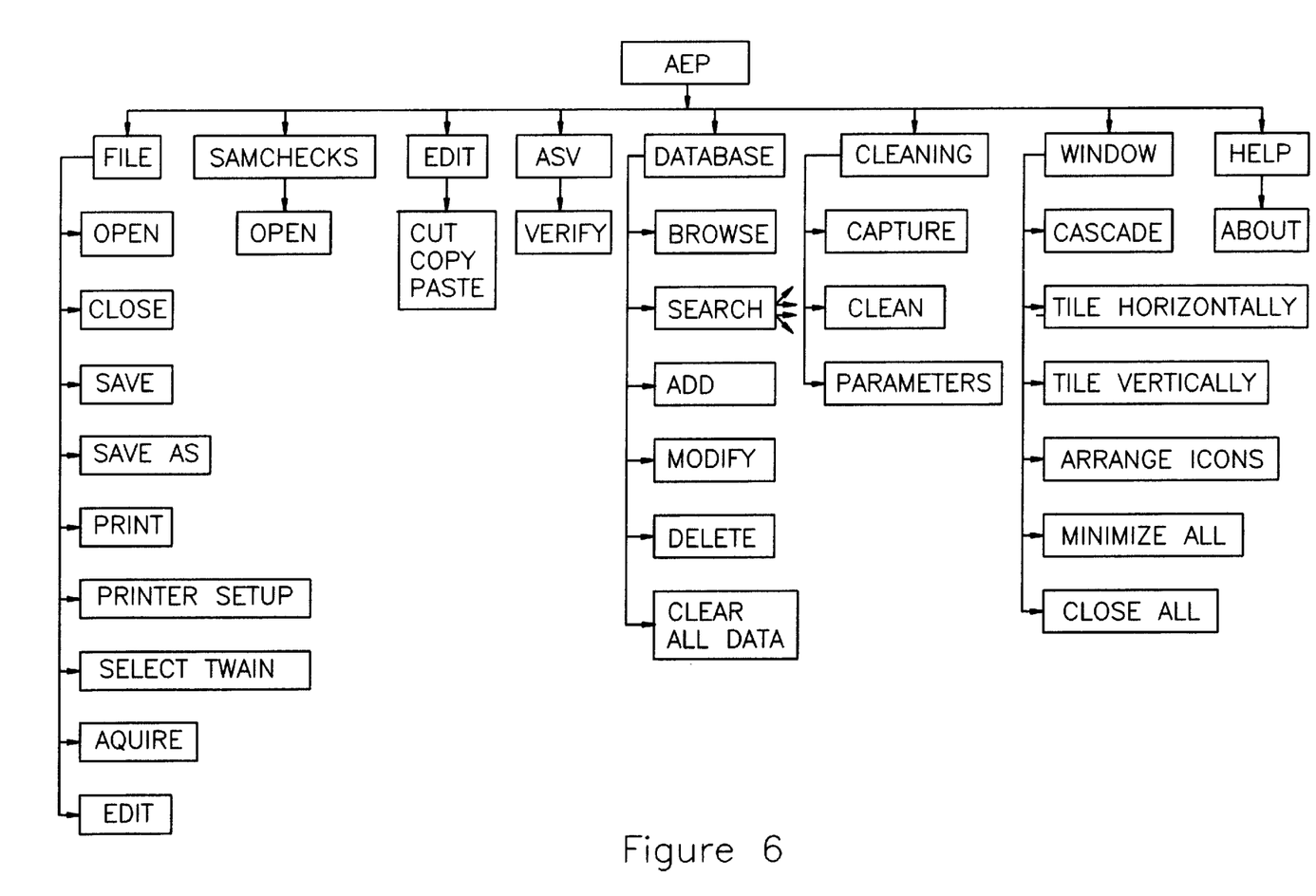
FIG. 6 is a block diagram showing a command menu of the automatic signature verification program.

During signature segmentation and feature extraction process 38, all three signature image types 32, 40, 44 are segmented into four quadrants 46 using their gravity center. FIG. 4 shows a gross approximation of a signature segmented into four quadrants. Image types 32, 40, 44 are also segmented into two vertical zones 48 using a baseline (see FIG. 5). Image types 32, 40, 44 are also segmented into two horizontal zones 50 using a geometrical mid point (see FIG. 5). Segments 46, 48, 50 are used to compute horizontal, positive, vertical, and negative slant features. Slant features 52 of a given signature image pixel, p(i,j) as follows: for horizontally slanted p(i,j+1); for positively slanted p(i−1,j+1); for vertically slanted p(i−1,j); and for negatively slanted p(i−1,j−1) represented in FIG. 2 as F1–Fn 52. Slant features 52 are analyzed on a global basis for the entire signature image and in each quadrant, each vertical zone, and each horizontal zone thereby providing 120 slant features 52, twelve global and one hundred and eight local since each slant feature 52 is measured on image types 32, 40 and 44.

Two additional features comprising complex elements are extracted by matching and mismatching a horizontal profile of target signature 16 with a mean horizontal profile of at least one training sample. Therefore, one hundred and twenty simple features and two complex features 52 are extracted (see FIG. 2, f1–f122).

Next, slant features 52 are measured for dissimilarity in dissimilarity measure routine 42. A comparative distance measure is made using a weighted Euclidean methodology 56. A feature set 58 is automatically selected using automatic evaluating program 14 for dissimilarity measurements. The weighting of the Euclidean distance measurement equations are also automatically selected by automatic evaluating program 14, as described in further detail below.

Dissimilarity measurements 60 give the distance relationship of selected features of target signature 16. This measure gives an indication of how far target signature 16 is from a set of training, or authentic, samples of the same person's signature. If all the training samples and target signatures are copies of each other, the dissimilarity measure is zero. To the degree that the training samples differ from each other and the target signature differs from them, the dissimilarity measure rises proportionally to that degree. For a specific person's signature, there is a natural degree of variation in the values of the features of the samples of their signature such that there is a natural range of dissimilarity measurement of the person. If the dissimilarity measure of the target signature exceeds this natural range, the target signature is judged to be an attempted forgery, otherwise, it is accepted as genuine. Computing this natural range is done with the help of automatic evaluating program 14, as described below.

Next, an adaptive decision threshold routine 62 determines an upper limit of the natural range of the dissimilarity measure of a specific person. The upper limit of the adaptive threshold is computed using parameters obtained from automatic evaluation program 14.

Figure 7:
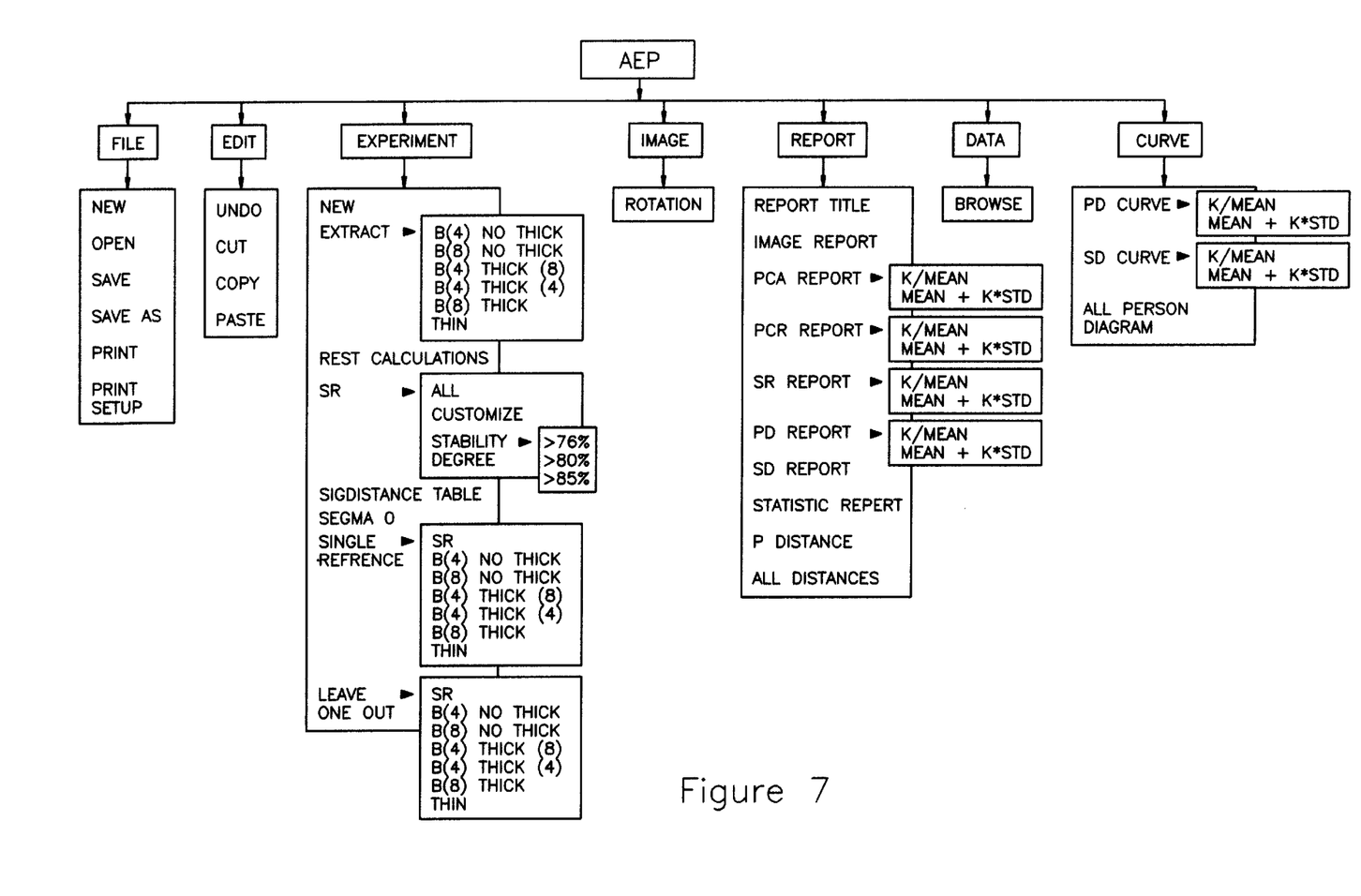
FIG. 7 is a block diagram showing a command menu for an accelerated evaluation program of the present invention.

Referring now to FIG. 7, the command menu of automatic evaluation program 14 is shown. Program 14 is a powerful development tool for augmenting automatic signature verification algorithms. It enables evaluation of the performance of the comparison program with respect to different image types, features, and decision-making methods. It also enables evaluation of the performance with respect to some conditions, stability degree, for example.

The aforementioned evaluations can be done in one click for the whole signature database. In this way, it is easy to reach the best possible features, image types, and resolutions under any conditions.

In order to compute the percentage of correct acceptance and correct rejection of genuine and forgery samples, respectively, or the two type error rates, the signature database used for evaluation must contain genuine and forgery samples of every person in the database. This is provided by collecting a signature database of over one thousand signatures comprised of persons having different language backgrounds, such as Arabic, English, and Japanese. The number of genuine samples and forgeries should be almost equal. With a database having these criteria, the minimum requirements for computing the parameters to be used in distance measure and adaptive decision threshold computations in automatic verification system 10 are available.

Automatic evaluation program 14 runs three main phases:
(1) Making Reference: For every person in the database, program 14 processes their genuine signatures, extracts features, computes reference statistics (mean and standard deviation of every feature of the one hundred and twenty two extracted features), and stores them in a corresponding file.
(2) Distance Measure: program 14 computes the distance measure (dissimilarity measure) for every genuine and forged signature in the signature database using weighted Euclidean distance routine 56 where the weights computed in (1) are the standard deviation of each feature. The distance measure for genuine samples and forgeries is computed as follows:
 (a) Genuine signatures: For genuine signatures, use leave one out method, which is appropriate even with a small number of reference samples. In this method, each reference sample is left out from the reference samples when its distance measure is computed. The reference statistics are computed from the remaining reference samples, and the distance measure of the left out sample is computed using these statistics for performance evaluation.
 (B) Forged signatures: For the forged signatures, the reference statistics are those computed in (1). The distance measures for forgery samples are computed using those statistics. Now, after computing the distance measure for every sample in the database, the performance evaluation is done as follows:
(3) Performance Evaluation: the decision making process is necessary for evaluation. The decision is made as follows: If the distance measure is larger than the verification threshold, the questioned signature is accepted as genuine, otherwise, it is rejected and classified as an attempted forgery.

Correct decisions: (1) If the questioned signature is genuine and accepted, it is a correct decision.

(2) If the questioned signature is a forgery, and rejected, it is a correct decision.

In order to explain the performance evaluation, first, the following definitions are introduced:

PCA: Percentage of Correct Acceptance. (Genuine accepted as genuine)

PCR: Percentage of Correct Rejection. (Forgery rejected and classified as a forgery)

SR: System Reliability. (PCA+PCR)/2 (average percentage of correct decisions). In order to evaluate performance of the ASVR using a specified feature set, The present invention uses a threshold based decision for finding how the performance (percentage of correct decisions) for the whole database varies with decision threshold change. In other words, the upper limit of the natural variation range of the dissimilarity measure of every person is marked by a threshold value (the verification threshold). This threshold is computed using a formula containing a constant k. This constant is given different values from 0.1 to 3.0 in 0.1 increments producing thirty different verification thresholds. For every value of the thirty values of the verification threshold, PCA PCR and SR are computed on the whole signature data Using the resultant values, the PCA, PCR and SR curves are computed.

The SR curve always has a relative maximum (a peak) showing the maximum level of accuracy obtained using the signature data used and a specific feature set. Naturally, if the data changes, the result will change somewhat respectively, either positively or negatively. The peak may or may not be the same crossover (tradeoff) point of the three curves.

If we choose the verification threshold to be the crossover point, then we choose the equal probability of error for PCA and PCR. If we take into account the error rate, then:

Type I error=100−PCA

Type II error=100−PCR

Average error rate=(Type I+type II)/2

Now, if we choose the verification threshold to correspond to a higher value than that which corresponds to the tradeoff point (equal two type errors point, or equal PCA and PCR point), then we will have a higher PCA and smaller PCR, due to more variations allowed in the input signature. The outcome of this higher threshold will not only be the acceptance of more genuine signatures for the same person, but the acceptance of more forgeries if they fall in the same range, too.

On the other hand, if we use lower threshold value, we will allow fewer variations of the signature; thus, a smaller number of genuine signatures will be accepted (less PCA), and more forgeries will be rejected (higher PCR). The threshold can be adjusted by the user to tighten or loosen the control in the general case. The individual accounts can be controlled by adjusting the learned parameter of the personalized thresholds.

The number of accepted forgeries depends on both the degree of stability of one's signature and the easiness of copying the signature. Such complexity is taken into account by computing decision parameters through a learning process of the entire database (global learning), which combines different types of signature shapes and degrees of stability as the appropriate ones. For some persons, however, this global threshold may not produce the best results.

The global threshold is not always the best threshold for everyone because it obviously is not customized to suit each individual. Such customization, however, may be closely attained by using the threshold which corresponds to the crossover point. The present invention uses "personalized thresholds," which are computed using a formula containing the average and the standard deviation of the distances of the genuine samples of the specific person (local learning), in order to acquire his or her individual statistics. By modifying the global threshold to include the individual statistics, the software produces the best results.

Program 14 gives automatically the best global verification threshold (GVTH) which corresponds to the maximum value of SR curve.

The personalized verification threshold is obtained by dividing the GVTH by the mean distance of the genuine samples (training) of the same person. This method makes the verification threshold adaptive to the person's signature which experimentally proved to give the best result judged by program 14.

As described above, in order to be able to compute the distance measure we must have some training samples. This makes verifying with single reference signature impossible. However, this is the actual case in banks where one or two reference samples on the bank card are available. In order to overcome this dead lock with this method of distance measure and verification, the AL is developed for the present invention.

In order to have meaningful learning about the person's signature, there must be five genuine signatures or more. In the actual case, this means that the ASV can not make decision until four more genuine signatures collected from the checks of that person. Practically, there is no guarantee that all checks bear genuine signatures so that the ASVR can not work with single reference signature. Accelerated learning developed in this invention solves this problem. Accelerated learning is given this name because it accelerates the learning process before having five or more genuine signatures. It works as follows: the signature database containing genuine and forgery samples of every person, is used with program 14 to get four classes of standard deviation of every feature used for verification. The four classes are (Horizontally, Positively, Vertically and Negatively slanted signatures). Program 14 is run for every class of these signatures available in the signature database, and at the end of the run, the mean of the standard deviation of each feature for each class is recorded as the "learned standard deviation" of the feature so that the Euclidean distance measure equation can be excuted using the learned standard deviation as a "weight" and the feature of the single reference signature as a "mean". Experimental results showed that using this accelerated learning method gives percentage of correct decisions in case of single reference signature close to that obtained with the standard deviation values obtained from five or more training samples.

Figure 8:
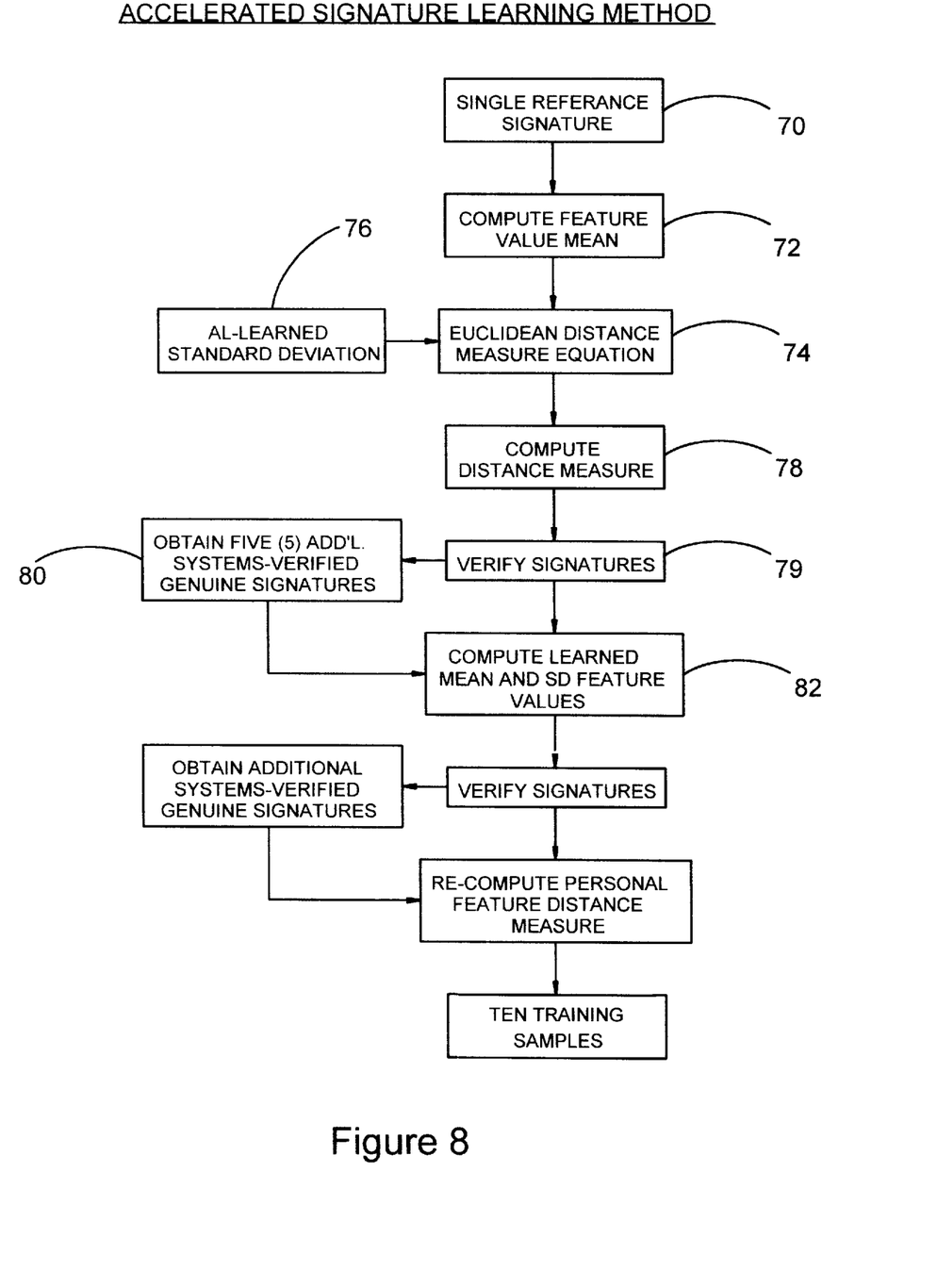
FIG. 8 is a flow diagram of a learning program according to the invention.

Referring now to FIG. 8, the actual learning and decision making in the present invention include: (1) The single reference signature 70 is used to compute the feature values and these values are used as the "mean" 72 of the feature in the Euclidean distance measure equation 74. (2) The standard deviation 76 learned by accelerated learning is used as the standard deviation (weight) of the feature in the Euclidean distance measure equation.

The distance measure used for verification, step 79, is computed, step 78, using these values until five genuine signature obtained from the checks verified for that person are obtained, step 80.

Starting from the sixth genuine signature, the learned values of the mean and standard deviation of each feature is computed from the values of the features computed on the set of six training samples including the single reference signature itself, step 82. From this point on, the accelerated learning values are abandoned (not used for this person).

As new genuine signatures come from checks, step 84, the number of learning samples increases and the accuracy improves until ten genuine training samples are collected.

The feature set used by the present invention is selected automatically by program 14 as follows:

(1) the one hundred and twenty features are arranged in a one dimensional feature table so that the number of the table entry contains the features from one to its number, i.e., entry number six contains features (1,2,3,4,5,6), entry number four contains features (1,2,3,4), and so on.

(2) A circular feature matrix is created from this one dimensional feature matrix so that the circular matrix is nXn if the dimensions of the one-dimensional matrix is n.

(3) Program 14 is run for all entries of the two-dimensional feature matrix and for every entry selects the maximum SR.

(4) Finally, program 14 selects the entry which gives the maximum SR among all entries to determine the feature set used by the present invention (the best feature set).

Signature verification system 10 then uses the two complex features f121 and f122 to give the first decision concerning the questioned signature. If it is accepted, it is passed to the second stage which uses the best feature set selected by program 14.

The present invention can process an account with more than one signature. First, the signature area is processed using vertical projections and connected components labeling with suitable rules to recognize if the check contains one, two or more signatures then the signature/s is segmented. Each segmented signature is matched with the reference signatures of the signatories of the account using a distance measure basis to recognize the correct reference signature. Once recognition is done, verification by ASVR becomes straightforward.

Since the program recognize signatures using features not matching images and sub-images with each other, the time needed for verification is very short.

I claim:

1. A system for automatic signature authentication comprising:

a) a computer-implementable signature processing program to examine a digitized signature image obtained from a document, optionally a check, the signature image purportedly being the signature of a specific person, to generate an authentication decision authenticating the signature as genuine or rejecting the signature as a forgery;

b) an authenticated signature database of signature features for use by the signature processing program in generating the authentication decision; and c) an evaluation program to evaluate the results produced by the signature processing program and to provide update information to the signature database for use by the signature processing program regarding examined signatures accepted as genuine by the signature processing program;

wherein:

d) the digitized signature image is scanned from a paper document;

e) multiple versions of the signature image are electronically generated and examined;

f) the results of examination are statistically compiled to enhance the authentication decision;

g) each version of the signature image is defined into segments, signature features are extracted from individual segments and the extracted signature features are evaluated against training data received from the evaluation program; and h) the extracted signature features are each analyzed globally for the complete signature and locally for each segment.

2. A system according to claim 1 wherein the system comprises a global signature feature database including samples of signature features of genuine and forged signatures of persons other than the specific person's signature together with available genuine samples of the specific person's signature wherein the global signature feature database is employed to analyze the extracted signature features for the complete signature and the extracted signature features are analyzed locally for each segment utilizing at least one genuine signature of the specific person.

3. A system according to claim 2 wherein the global signature database is employed for signature recognition until the database includes a desired number of genuine samples of the specific person's signature.

4. A system according to claim 2 wherein the digitized signature image is cleaned prior to generation of multiple versions by removing printed background characters, noise and unconnected lines not meeting signature image component criteria.

5. A system according to claim 2 wherein the multiple versions of the signature image comprise an unmodified version, a thinned version and a boundary-detected version.

6. A system according to claim 5 wherein the unmodified version is obtained by cleaning the signature image and is passed directly to a dissimilarity measurement procedure and wherein a second version of cleaned signature image is processed in a normalization procedure to adjust the image to a system standardized configuration with regard to orientation and position, the thinned version and boundary-detected versions being generated from the normalized second version image.

7. A system according to claim 6 wherein the thinned version is generated from the normalized second version image in a line thinning routine, the boundary-detected version is generated from the normalized second version image, the second version image being normalized with respect to writing line width and writing line size in the size normalization routine to provide the boundary detected image.

8. A system according to claim 2 wherein the segments comprise a first set of four quadrants defined from a center of gravity of the signature image, a second independent set of two vertical zones on either side of the center of gravity and a third independent set of two horizontal zones on either side of the center of gravity.

9. A system according to claim 2 wherein the extracted signature features are evaluated for their distance from a reference obtained from the evaluation program, the distance being computed from at least one genuine signature and being used to effect the authentication decision according to a threshold.

10. A system according to claim 9 wherein the threshold is adapted by the evaluation program according to new data from genuine signatures received by the evaluation program to enhance the decision.

11. A system according to claim 2 wherein two complex element signature features are extracted by matching and mismatching a horizontal profile of the signature image with a mean horizontal profile of a training sample comprising at least one genuine signature.

12. A system according to claim 2 wherein the evaluation program determines a feature set of said extracted signature features to be used by the signature processing program for the decision.

13. A system according to claim 2 wherein said authentic signature database includes image data from actual signatures on documents wherein said authentic signature data includes signatures of a person used to writing English, a person used to writing Japanese, a person used to writing Korean or a person used to writing Arabic.

14. A system according to claim 2, wherein said authentic signature database includes signature image data having a resolution of 80 dpi or less.

15. A system according to claim 2 wherein said authentic signature database includes at least one thousand individual records.

16. A system according to claim 2 wherein said authentication decision is qualified by a self evaluation routine to maintain a maximum ratio of an average of the percentage of correct acceptance decisions and an average of correct rejection.

17. A system according to claim 2 comprising a bank check signature verification system.

18. A system for automatic signature authentication comprising:

a) a computer-implementable signature processing program to examine a digitized signature image obtained from a document, optionally a check, the signature image purportedly being the signature of a specific person, to generate an authentication decision authenticating the signature as genuine or rejecting the signature as a forgery;

b) an authenticated signature database of signature features for use by signature processing program in generating authentication decision; and c) an evaluation program to evaluate the results produced by the signature processing program and to provide update information to the signature database for use by signature processing program regarding examined signatures accepted as genuine by the signature processing program;

wherein.

d) the digitized signature image is scanned from a paper document;

e) multiple versions of the signature image are electronically generated and examined;

f) the results of examination are statistically compiled to enhance the authentication decision;

g) the multiple versions of the signature image comprise an unmodified version, a thinned version and a boundary-detected version;

h) the unmodified version is obtained by cleaning the signature image and is passed directly to a dissimilarity measurement procedure; and i) a second version of the cleaned signature image is processed in a normalization procedure to adjust the image to a system standardized configuration with regard to orientation and position;

j) the thinned version is generated from the normalized second version image in a line thinning routine; and k) the boundary-detected version is generated from the normalized second version image by normalization with respect to writing line width and writing line size.

19. A system for automatic signature authentication comprising:

a) a computer-implementable signature processing program to examine a digitized signature image obtained from a document, optionally a check, the signature image purportedly being the signature of a specific person, to generate an authentication decision authenticating the signature as genuine or rejecting the signature as a forgery;

b) an authenticated signature database of signature features for use by signature processing program in generating authentication decision; and c) an evaluation program to evaluate the results produced by the signature processing program and to provide update information to the signature database for use by signature processing program regarding examined signatures accepted as genuine by the signature processing program;

wherein;

d) the digitized signature image is scanned from a paper document;

e) multiple versions of the signature image are electronically generated and examined;

f) the results of examination are statistically compiled to enhance the authentication decision;

g) each version of the signature image is defined into segments, signature features are extracted from individual segments and the extracted signature features are evaluated against training data received from the evaluation program; and h) the segments comprise a first set of four quadrants defined from a center of gravity of the signature image, a second independent set of two vertical zones on either side of the center of gravity and a third independent set of two horizontal zones on either side of the center of gravity.

20. A system according to claim 19 wherein horizontal, vertical, positive and negative slant features in each said segment are computed and output as signature features to the signature database.

21. A system for automatic signature authentication comprising:

a) a computer-implementable signature processing program to examine a digitized. signature image obtained from a document, optionally a check, signature image purportedly being the signature of a specific person, to generate an authentication decision authenticating the signature as genuine or rejecting the signature as a forgery; and b) an authenticated signature database of signature features for use by the signature processing program in generating the authentication decision;

wherein:

c) multiple versions of the signature image are electronically generated and examined, the examination results being statistically compiled to enhance the authentication decision;

d) the multiple versions of the signature image comprise an unmodified version, a thinned version and a boundary-detected version;

e) the unmodified version is obtained by cleaning the signature image and is passed directly to a dissimilarity measurement procedure;

f) a second version of the cleaned signature image is processed in a normalization procedure to adjust the image to a system standardized configuration with regard to orientation and position, g) thinned and boundary-detected versions are electronically generated from the normalized second version image;

h) the thinned version is generated from the normalized second version image in a line thinning routine;

i) the boundary-detected version is generated from the normalized second version image;

j) the normalized second version image is normalized with respect to writing line width and writing line size in the size normalization routine to provide the boundary detected image; and k) each version of the signature image is defined into segments, signature features are extracted from individual segments and extracted signature features are evaluated against training data received from an evaluation program.

22. A system according to claim 21 wherein the segments comprise a first set of four quadrants defined from a center of gravity of the signature image, a second independent set of two vertical zones on either side of the center of gravity and a third independent set of two horizontal zones on either side of the center of gravity.

23. A system according to claim 22 wherein horizontal, vertical, positive and negative slant features in each said segment are computed and output as signature features to the signature database and wherein the extracted signature features are each analyzed globally for the complete signature and locally for each segment.

24. A computer-implemented method of automatic signature authentication comprising:

a) employing a signature processing program to examine a digitized signature image obtained from a document, optionally a check, the signature image purportedly being the signature of a specific person;

b) employing an authenticated signature database of signature features to generate an authentication decision authenticating the examined signature as genuine or rejecting the signature as a forgery; and c) employing an evaluation program to evaluate the results produced by the signature processing program and provide update information to the signature database for use by the signature processing program regarding examined signatures accepted as genuine by the signature processing program;

wherein the examined signature is evaluated as genuine, the database contains less than a desired number of genuine samples and the method further comprises:

d) adding the examined sample signature data to the database and recomputing reference statistics for use in generating the authentication decision using the added examined sample signature data wherein the reference statistics comprise a signature feature set and a decision threshold;

e) employing a global signature feature database including signature features of genuine and forged samples of signatures of persons other than the specific person's signature together with available genuine samples of the specific person's signature;

f) employing the global signature database for signature recognition until the database includes a desired number of genuine samples of the specific person's signature;

g) defining the signature image into segments wherein the segments comprise a first set of four quadrants defined from a center of gravity of the signature image, a second independent set of two vertical zones on either side of the center of gravity and a third independent set of two horizontal zones on either side of the center of gravity;

h) extracting signature features from individual segments; and i) extracting and evaluating signature features against training data received from the evaluation program.

* * * * *